June 19, 1951  J. B. ARMITAGE ET AL  2,557,404
CUTTING TOOL
Filed May 9, 1945  2 Sheets-Sheet 1
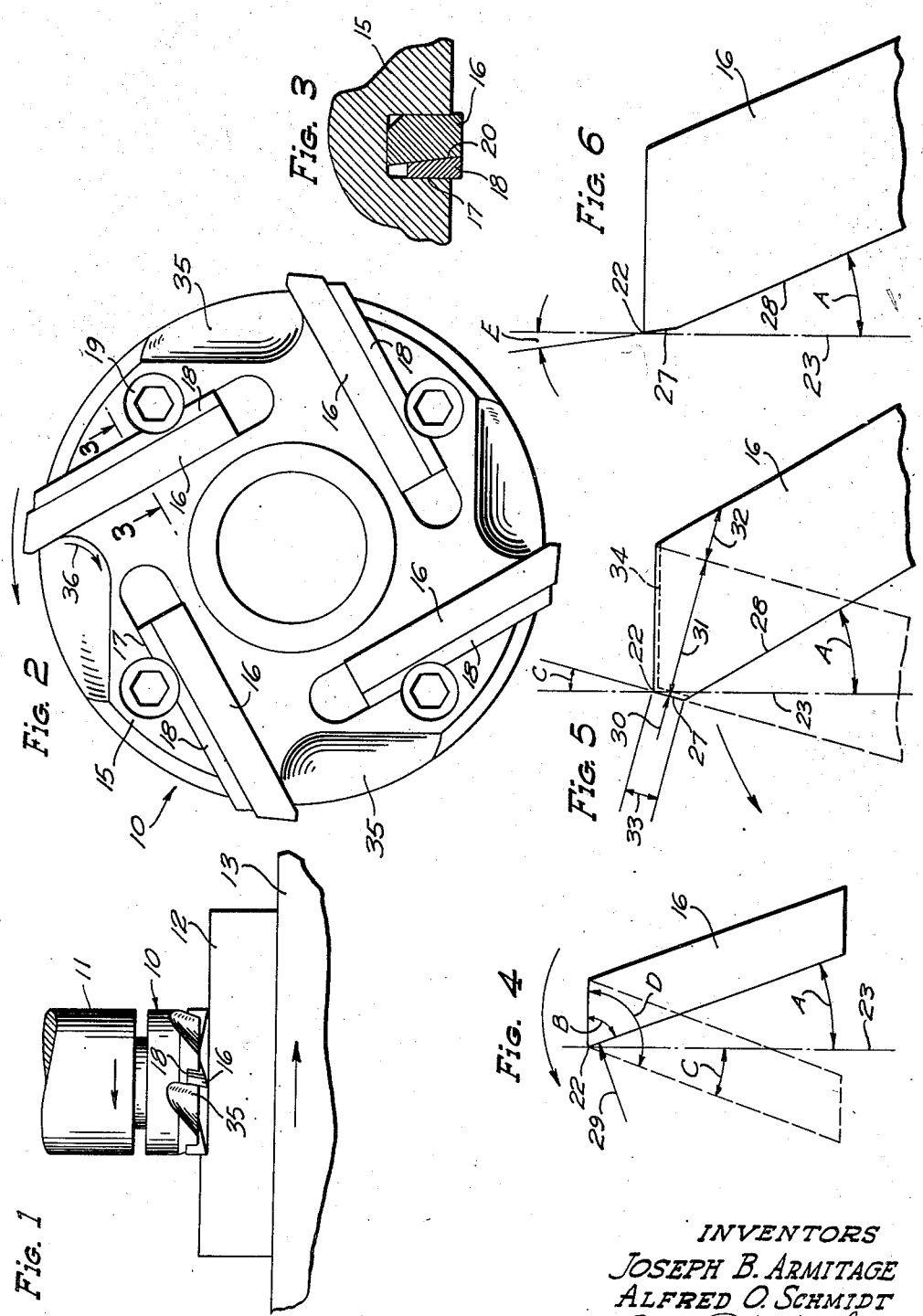
INVENTORS
JOSEPH B. ARMITAGE
ALFRED O. SCHMIDT
By Elroy J. Wutschel
ATTORNEY June 19, 1951 J. B. ARMITAGE ET AL 2,557,404
CUTTING TOOL
Filed May 9, 1945 2 Sheets-Sheet 2

INVENTORS
JOSEPH B. ARMITAGE
ALFRED O. SCHMIDT
BY
ATTORNEY

Patented June 19, 1951

2,557,404

UNITED STATES PATENT OFFICE 2,557,404

CUTTING TOOL

Joseph B. Armitage and Alfred O. Schmidt, Wauwatosa, Wis., assignors to Kearney & Trecker Corporation, West Allis, Wis., a corporation of Wisconsin Application May 9, 1945, Serial No. 592,826

8 Claims. (Cl. 29—105)

1

This invention relates to cutting tools for machine tools and more particularly to cutter tooth construction.

A general object of this invention is to provide a machine tool cutter having teeth with dual tooth faces.

Another object of this invention is to provide a cutter having the combined advantages of conventional positive and negative rake angle cutters.

A further object of the invention is to provide a cutter tooth having a primary rake angle to increase the strength of the cutting tip and a secondary rake angle to reduce the power required to operate the cutter.

A further object is to provide a multiple tooth cutter having improved chip flute construction to provide a continuous and even flow of chips.

A still further object of the invention is to provide an improved blade clamping means for an inserted blade type cutter, in order to leave the front side of the blade clear for chip control.

Another object of this invention is to provide a general purpose cutter which may be readily converted from a negative rake cutter to a positive rake cutter or vice versa.

A further object is to provide a dual faced cutter blade requiring a minimum of stock to be removed to renew the cutting edge and thereby conserve cutter tip material.

Another object is to provide a cutter tooth formation in which the tendency to crater is minimized.

Another object is to provide a dual faced cutter which may be readily sharpened by grinding a minimum of stock from one of the tooth faces and the land behind the cutting edge.

According to this invention, an improved multiple tooth cutter is provided for use with a machine tool wherein the cutter teeth are designed to provide maximum cutting efficiency with a minimum of power expended. The cutter is provided with teeth having a primary rake angle and a secondary rake angle. The primary angle is chosen to provide the greatest strength at the tip of the tooth while the secondary angle is selected to reduce deformation in the chip and, consequently, to require a minimum of operating power from the machine tool per unit of cutting force expended. Cratering and excessive wear on the tooth faces is reduced considerably. When resharpening the cutter, a light cut off of the primary face and the relief face behind the edge serves to renew the cutting edge and to conserve the tip stock. The rake angle of the

2 primary tooth face can be readily changed from positive to negative or from negative to positive without resetting the blades or altering the cutter body. In addition, the cutter body chip flute is designed to guide the chip away from the cutting edge with extreme ease with the blade clamping means disposed behind the blade.

The foregoing and other objects and advantages of this invention will become apparent from the following specification and may be achieved by the cutting tool described in connection with the accompanying drawing illustrating the invention, in which:

Figure 1 is an elevational view showing a cutter, incorporating the principles of the invention, operating upon a workpiece;

Fig. 2 is a bottom view of the cutter shown in Fig. 1, showing the cutting blades clamped in position;

Fig. 3 is a transverse section on the lin 3—3 in Fig. 2, showing the position of the blade and wedge in a cutter slot;

Fig. 4 is a diagrammatic showing of a conventional negative radial rake and a positive radial rake cutter tooth;

Fig. 5 is an enlarged view of one of the cutter blades shown in Fig. 2 with the cutter tip construction exaggerated to fully disclose the invention;

Fig. 6 is a modification of the invention, as shown in Fig. 5, showing a double face cutter tooth;

Figure 8:
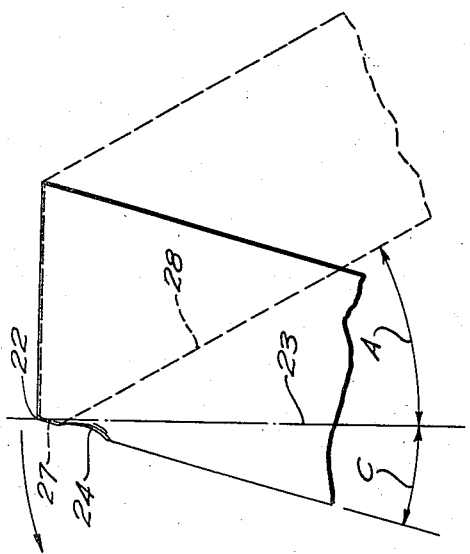
Fig. 8 is an enlarged view of a cutter blade disposed at a negative radial rake showing cratering action thereon.

Referring to Fig. 1, a cutter 10 is rotatably driven by a tool retaining spindle 11 in a machine tool and is disposed to engage a workpiece 12 clamped on a reciprocal tube 13 of the said tool. As is usual in milling machine practice, provision is made to drive the cutter at any one of a plurality of speeds within a comparatively wide range and to operate the work holder or table at one of a plurality of feed rates. Although the drawing shows the cutter incorporating the invention applied to a milling machine, it is to be understood that the invention may be readily adapted to other types of machine tool cutters with equal advantage. The cutter is assumed to be rotating in the same direction, as indicated by the arrow in each of the figures.

Figure 7:
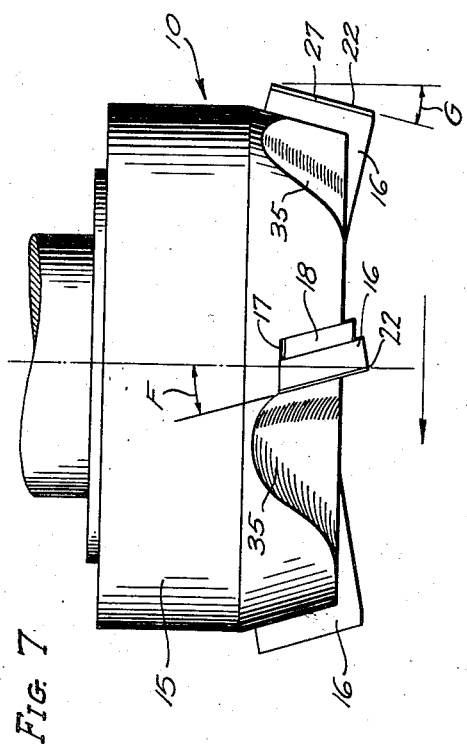
Fig. 7 is an elevational view of a cutter in which the dual faced blades are mounted at a negative axial rake angle.

The cutter assembly 10, as shown in Figs. 2 and 7, is of the face mill type and comprises a cutter body 15 having a plurality of cutter blades or teeth 16 disposed in machined slots 17 therein. Each blade is rigidly clamped in the body by a wedge plate 18, which is locked in position by a self-locking cap screw 19. The machined slot 17 has parallel side walls, while mating surfaces 20 on the blade and wedge are inclined at a slight angle relative to the side walls, as shown in Fig. 3. With the parts thus disposed in the slot, the wedge 18 may be driven into a blade locking position with sufficient force to retain the blade 16 against all movement, including endwise movement. The screw 19 is used as a safety measure, although tests have shown that the blades will not loosen when retained in this manner with the screw omitted.

The development of machine tool cutters in the past has been more or less a matter of chance. However, recent technological advances in the machine tool field have necessitated a complete change to a strictly scientific basis of development. The various angles on the cutter blade or tooth are important in determining the efficiency of the cutter. Each combination of angles serves to produce a different result in cutting. Thus, it was found that the radial rake angle of the blade, i. e., the angle formed between the blade face and a radial line passing through the blade nose or cutting edge, is vitally important. Most of the early multiple tooth cutters were formed with the blade or tooth positioned at a positive rake angle, as shown by angle A in Fig. 4. The inherent weakness of this type of blade or tooth is that the lip angle, as designated by the angle B, is comparatively small and, consequently, the blade is weakest structurally directly behind cutting edge 22. Although the tool forces are less for cutters with this type of blade, this weakness will cause the cutting edge to wear and the power requirements of the cutter will rise quickly as the edge breaks down from such wear.

Figure 9:
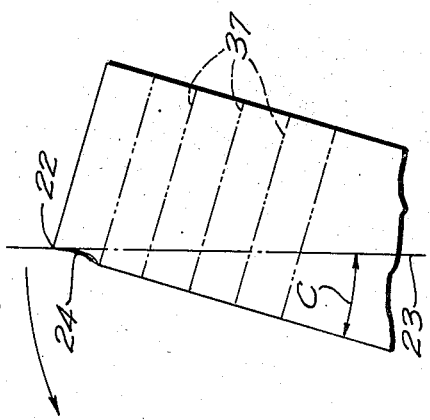
Fig. 9 is an enlarged view of a conventional negative rake cutter blade with dotted lines suggesting the amount of stock removed in sharpening the blade.

A second type of multiple tooth cutter uses a negative rake angle blade or tooth. This type of blade is shown in Figs. 4, 8 and 9 with the negative rake angle, i. e., the angle between a radial line 23 drawn through the cutting edge 22 and the tooth face, indicated by the letter C. As shown by the dotted lines in Fig. 4, this blade or tooth is stronger directly behind the cutting edge 22, since more stock lies behind this edge. The lip angle, as designated by the letter D, is greater than the lip angle B of the positive rake cutter blade. This causes the tool forces to be higher in the negative rake angle cutter but, since wear occurs on the cutting edge at a slower rate, the power requirements of this cutter will increase more slowly than the power requirements of a positive radial rake cutter as the edge wears. The tooth faces on this type of cutter tend to crater, as suggested by lines 24 in Fig. 8, due to the excessive friction created by the chips during a cutting operation.

Figure 10:
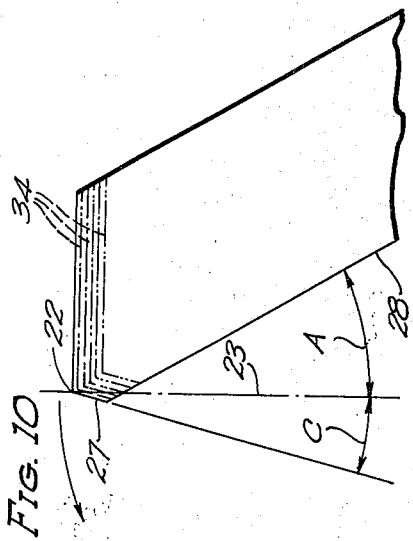
Fig. 10 is an enlarged view of the improved cutter blade with dotted lines suggesting the amount of stock removed in sharpening this type of blade.

By using double radial rake angle cutter blades or teeth according to the teaching of this invention, as shown in Figs. 5 and 10 and hereinafter fully described, the advantages of both positive radial rake and negative radial rake cutters are obtained. A primary tooth face 27 is disposed immediately adjacent to the cutting edge 22 while a secondary tooth face 28 adjoins the primary tooth face. These two faces constitute the leading face of a cutter tooth or, in the case of an inserted type cutter, they constitute the leading face of a cutter blade. The primary face 27 is disposed at an angle C to the radial line 23 extending through cutting edge 22 of the tooth or blade and the secondary face 28 is disposed at an angle A to the radial line. Actual tests have shown that, for milling steel, the angle C should preferably be a negative rake angle in the range of 0° to 15°, while the angle A should be in the range of 0° to 30° positive. In Figs. 5 and 10, a primary rake angle of 15° negative was used and a secondary rake angle of 30° positive was used. It is to be understood that the values accorded these angles were chosen for illustrative purposes only and that the actual values accorded them should be determined from numerous tests based on such factors as cutter design, material in the cutter, and the material in the workpiece upon which the cutter is operating.

Cutting forces are imparted to the blade at right angles to the tooth face. Thus, as shown in Fig. 4, the cutting forces acting upon the blade 16 disposed at a positive radial rake angle would necessarily act in a plane through the tooth tip parallel to the cutting edge 22, as suggested by an arrow 29. Since the amount of stock along the cuting edge is very small, the cutting forces naturally tend to shear off the edge at the time of impact with the workpiece. In the case of a negatively disposed cutter blade, the cutting forces imparted to the blade during a cutting operation are counteracted by a tooth force substantially greater than that occurring in a blade disposed at a positive radial rake angle. In this type of blade, the amount of stock available to counteract the cutting forces imparted to the tooth face is generally equal to the width of the cutter blade. In the case of a cutter blade or tooth having a double rake angle tooth face, such as is shown in Fig. 5, the amount of stock directly behind the primary tooth face 27 is substantially greater than the amount of stock in a corresponding plane in either the conventional positive or negative rake angle blades, such as are shown in Fig. 4. Thus, a cutting force imparted to the primary tooth face 27, as suggested by an arrow 30 in Fig. 5, would be imparted to the blade or tooth at right angles to the primary face. The amount of stock in a plane substantially at the center of the primary tooth face 27 is indicated by an arrow 31 and an arrow 32. The arrow 31 represents the maximum width of stock in a similar plane in a negatively disposed cutter blade, as suggested by the dotted line showing in Fig. 5. Since the amount of stock, indicated by arrow 31, in a plane substantially at right angles to the tooth face of a negatively disposed cutter blade represents the maximum amount of stock available to counteract the cutting forces because of the cutter or tooth design prior to this time, the gain in stock, as represented by the arrow 32, is rather substantial. This improved tooth design has resulted in a great increase in cutter life. The heat created by the contact of the cutter tip with the workpiece while the blade is moving through the metal will be more readily dissipated because of the greater cross sectional area in this type of blade and, consequently, the cutting edge 22 will stand up far better during a production cutting operation than would the conventional positive or negative rake type of cutter.

Since the power requirements of a negative rake cutter are substantially higher than a positive rake cutter, the length of the primary tooth face 27 is held to a minimum. The optimum length may be readily determined by various tests.

Thus, for steel cutting operations, it has been found that the length of the primary tooth face, as indicated by the arrow 33 should be approximately one to three times the width of feed per tooth, which will be taken with the particular cutter; while in the case of cast iron cutting operations, it need only be one-half of the width of feed per tooth. The secondary tooth face 28 adjoining the primary face is disposed to gain the inherent advantage of a positive radial rake cutter, namely to require a minimum of power during the cutter operation by aiding the flow of chips away from the cutting edge 22.

The cratering on a negatively disposed blade or tooth occurs on the tooth face somewhat away from the cutting edge. If a dual faced blade is superimposed on the negatively disposed blade, as suggested by dotted lines in Fig. 8, it will be readily seen that the length of the primary face 27 corresponds approximately to the distance from the cutting edge 22 to the point at which the crater 24 begins to form. Since cratering is caused by the extreme pressure of the chips upon the tooth face and is especially pronounced on a negatively disposed blade or tooth after the cutter has been used awhile, it is evident that the cratering action can be reduced or eliminated by reducing the negative rake angle or preferably by using a positive rake angle A such as is used with the secondary tooth face 28. This face is well behind the crater 24 and, consequently, little or no cratering will occur thereon. As the chips leave the primary face 27 the pressure between the chip and the tooth face is gradually relieved as it moves across the secondary tooth face 28. The chips may or may not actually engage the face 28 depending on the rake angle used and upon the thickness of the chips.

In the inserted blade type of cutter, the angle of the secondary tooth face 28 is determined by the rake position of the blade 16 in the cutter body 15 while the primary tooth face 27 is actually ground on the tip of the blade. In a solid cutter with teeth integrally formed with the body, the primary tooth is precision ground, while the secondary face is formed in the cutter body and, if accurately formed originally, may never need regrinding. Likewise, in the case of cutters having brazed tips, the secondary angle corresponds to the angle at which the tip is brazed on the body, while the primary tooth face is formed identically on all of the teeth by a simple precision grinding operation.

Sharpening cutters having a double tooth face is comparatively simple, since it is generally sufficient to regrind only the primary tooth face and the landular surface behind the cutting edge. A few thousandths of an inch of stock removed from each of these surfaces is generally sufficient to remove any craters or worn spots and to present an entirely new pair of surfaces and a new cutting edge. As suggested by dotted lines 34 in Figs. 5 and 10, the total amount of material removed in sharpening this type of tooth is very nominal in comparison with the amount of material removed when sharpening conventional type cutters having a single rake angle. In these types of cutters, cratering occurs on the tooth face immediately adjacent to the cutting edge and excessive wear generally occurs on both faces adjacent to the edge. In order to remove the craters on the tooth face and the worn surfaces, it is necessary to grind a considerable amount of stock from the entire end of the blade whenever the cutter is sharpened. Thus, as in the case of a blade set at a negative radial rake angle C having a crater 24 worn in the tooth face, as shown in Fig. 9, the cutting edge 22 could be renewed only by taking a cut off of the entire top end of the blade. After five sharpenings, as suggested by the five dotted lines 37, the blade would have to be reset in the cutter body 15, or whereas, in the case of a brazed carbide tipped blade, the blade would have to be scrapped. In sharpening a dual faced blade five times, as suggested by the dotted lines in Fig. 10, very little stock is removed. The expensive carbide steel tip stock is conserved in this manner. Thus, it is evident that the overall life of a double faced type cutter is much longer, since the cubical capacity of the material removed with this cutter is much greater between resharpenings and the amount of stock necessarily removed to resharpen the cutter is much less.

A modification in the blade tip or tooth structure of a cutter incorporating a multiple tooth face with each having a separate rake angle is shown in Fig. 6. This modification in the tip structure is especially useful in cutters adapted to operate on non-ferrous metals such as aluminum and brass. In this case, the cutting edge 22 is strengthened by providing a primary tooth face 27 set at a positive radial rake angle E. A secondary tooth face 28 is disposed adjacent to the primary face 27 at a positive radial rake angle A. Since angle E is smaller than angle A, the tip is strengthened sufficiently to withstand the increased cutting forces incurred when cutting such metals at an increased feed rate.

A general purpose cutter is provided in that the cutter may be readily converted from a positive to a negative rake angle cutter, or vice versa, merely by regrinding the primary tooth face 27. In comparing the primary face formation in Figs. 5 and 6 it is evident that very little stock would be lost in converting the cutter. The blade would not have to be reset in the cutter body since the secondary rake angle A would remain the same. Thus, in a small shop only one cutter of a particular style would have to be carried in stock. In like manner, the angle of the primary face 27 may be readily changed to meet the requirements of a particular cutting operation. In the conventional type of cutter, the rake angle is determined by the setting or position of the blade or tooth in the cutter body and, consequently, such a conversion is not possible.

With the double face tooth, the chips are severed from the workpiece with a minimum of power expended. The primary face 27 serves to present a greatly strengthened cutting edge to the workpiece in order to withstand cutting forces sufficiently great to deform the metal and effect separation in the cutting plane. The secondary face 28 serves to afford a path offering a minimum of resistance to the chip as it leaves the primary face. An axially disposed chip control or guide means in the form of a flute 35 integrally formed in the cutter body 15 provides a continuous guide surface upon which the chip can slide from the secondary face 28, as indicated by an arrow 36 in Fig. 2.

As previously described, the blade wedge plate 18 and lock screw 19 are located directly behind the blade 16 and do not present an obstruction to chip flow, such as often occurs in conventional cutters having the wedge plate in front of the blade. Thus, the curvature of the flute 35 can be sufficiently large and predeterminately formed to carry the chips off of the secondary face 28 with a minimum of interference. Due to the rotation of the cutter, an inertial force is imparted to the chip to throw it out of the cutter flute and leave the blade or tooth clear for a subsequent cut. The secondary tooth surface and the curved surface of the flute provide a continuous guide and support for the chip. All chips ejected from a cutter incorporating this feature are identically formed and do not show any signs of excessive deformation. Tests have shown that the elimination of such chip deformations results in a great reduction in the power demands on the machine tool utilizing the cutter, together with a reduction in vibration and machine maintenance. This feature is especially valuable in cutters which are to be operated at extremely high speeds.

In Fig. 7, the invention is shown applied to cutter blades 16 carried in a cutter body 15 at an axial rake angle F and having a peripheral cutting edge angle or corner angle G. The dual radial rake angles on this blade offer the same advantages as previously described. The blades may be mounted in the body 15 in slots 17 with the wedge 18 disposed behind the blade to lock each one in position. Thus the front of the blade is left open for chip control via a flute 35.

While the invention has been shown and described with dual radial rake angles, it is to be understood that it may be applied with various combinations and types of rake angles with equal advantage. It is to be likewise understood that the angles shown in the drawing were chosen to best exemplify the invention and that the actual values which could be accorded such angles, or combination of angles, are very numerous. Rake angle values are dependent on various factors such as the type of cutter, type of material in the cutting tip, and the type of material being cut; and, consequently, can best be determined by operational tests.

Although the invention has been shown and described in considerable detail for the purpose of making a full disclosure thereof, it should be understood that the individual features of the invention may be included in other structural forms wtihout departing from the spirit and scope of the invention, as described in the subjoined claims.

The principles of the invention having now been fully explained in connection with the foregoing description of the illustrative embodying apparatus, the invention is hereby claimed as follows:

1. A high speed rotary cutter for machine tools, comprising a cutter body having a plurality of slots, a plurality of blades disposed in the slots, clamping means behind each of said blades, a cutting edge on each of said blades, a primary tooth face joining with said edge, a secondary tooth face adjacent to said primary face, a chip guide means joining with said secondary face whereby chips resulting from a cutting operation with said rotary cutter are carried away from said edge and primary face onto said secondary face and said guide means at a high rate to positively clear said edge of chips.

2. In a multiple tooth rotary cutter for a machine tool, a cutter body, a plurality of teeth on said body, a secondary tooth face on each tooth with a positive radial rake angle, a primary tooth face adjacent said secondary face on each tooth having a negative radial rake angle, a landular surface on each tooth, and a cutting edge formed at the junction of said landular surface and said primary face of each tooth whereby said cutting edge is strengthened by said primary face and chip flow is facilitated by said secondary face.

3. A multiple tooth rotary cutter for a machine tool and having a body and a plurality of radiating teeth, each tooth having a relief land, a primary tooth face, a cutting edge formed at the junction of said land and said face, a secondary tooth face adjoining said primary face, and a chip guide means meeting with said secondary face whereby said primary and secondary faces and said guide means provide a continuous guiding surface for chips.

4. A tooth formation for a machine tool cutter, comprising a cutter body, a plurality of evenly spaced teeth on said body, a cutting edge on each tooth, a primary tooth face adjacent each cutting edge at a negative radial rake angle to strengthen said edge, a secondary tooth face joining with said primary face at a positive radial rake angle to facilitate chip flowage from said cutting edge, and a chip control means in said body joining with said secondary face to eject chips from said cutter body.

5. In a machine tool cutter, a cutter body, a plurality of teeth projecting from said body, a land on each of said teeth, a primary tooth face on each of said teeth, a cutting edge formed at the junction of said land and said primary face, and a secondary tooth face adjacent said primary face, whereby said cutting edge may be renewed by grinding a minimum of stock from said land and said primary face.

6. A rotatable high speed cutter comprising a cutter body, a plurality of teeth extending from said body, a cutting edge on each of said teeth, a primary tooth face adjacent each edge, a secondary tooth face joining with said primary face, a chip control means joining with said secondary face whereby chips during a cutting operation pass from said edge and said primary face onto said secondary face with diminished pressure and are continuously supported and guided by said face and said means until ejected from said cutter.

7. A rotary machine tool cutter comprising a cutter body having a plurality of slots formed therein at a positive rake angle, a plurality of cutting blades clamped in the slots on said body, a cutting edge on the extreme forward end of each of said blades, a primary tooth face formed at a negative rake angle adjacent the cutting edge on each of said blades, a secondary tooth face joining with said primary face and formed by the angle of said blades in said cutter body, and a chip guide means predeterminately shaped and disposed in said cutter body adjacent said secondary tooth on said blades to receive chips therefrom in a manner to form them with a minimum of power being required to drive said cutter.

8. A multiple tooth cutter for machine tools comprising a cutter body having a plurality of blade retaining slots formed in said body at a positive radial rake angle, a plurality of blades mounted in the slots of said cutter body and each presenting a cutting edge on the outermost end thereof, a primary tooth face on each tooth adjacent the cutting edge with said face formed thereon at a preselected negative rake angle, and a secondary tooth face adjoining said primary tooth face on each of said blades and having a positive radial rake angle corresponding to the radial rake angle of the slots in said body whereby the angle of said primary tooth face may be readily changed by grinding without changing the position of said blades in said cutter body.

JOSEPH B. ARMITAGE.
ALFRED O. SCHMIDT.

REFERENCES CITED

The following references are of record in the file of this patent:

UNITED STATES PATENTS

| Number | Name | Date |
|---|---|---|
| 1,747,455 | Miller | Feb. 18, 1930 |
| 1,756,516 | Klopstock | Apr. 29, 1930 |
| 1,912,666 | Swanson | June 6, 1933 |
| 1,964,972 | Binns | July 3, 1934 |
| 2,033,384 | Marshall | Mar. 10, 1936 |
| 2,186,417 | Kraus | Jan. 9, 1940 |
| 2,239,794 | Morse | Apr. 29, 1941 |
| 2,328,493 | Reaney | Aug. 31, 1943 |
| 2,367,221 | Kraus | Jan. 16, 1945 |
| 2,382,509 | Seiter | Aug. 14, 1945 |

FOREIGN PATENTS

| Number | Country | Date |
|---|---|---|
| 683,022 | Germany | Oct. 27, 1939 |